United States Patent
Linet et al.

(10) Patent No.: US 7,707,909 B2
(45) Date of Patent: May 4, 2010

(54) DEVICE FOR DRIVING ACCESSORY MACHINES OF A GAS TURBINE ENGINE

(75) Inventors: Hugues Henri Raymond Linet, Asnieres sur Seine (FR); Cyril Franck Mouchnino, Paris (FR); Serge Dominique Pettinotti, Courbevoie (FR)

(73) Assignee: Hispano-Suiza, Colombes (FR)

( * ) Notice: Subject to any disclaimer, the term of this patent is extended or adjusted under 35 U.S.C. 154(b) by 563 days.

(21) Appl. No.: 11/551,455

(22) Filed: Oct. 20, 2006

(65) Prior Publication Data
US 2007/0173365 A1 Jul. 26, 2007

(30) Foreign Application Priority Data
Oct. 21, 2005 (FR) .................................. 05 53214

(51) Int. Cl.
*F16H 47/00* (2006.01)
*F16H 37/06* (2006.01)
*F02C 1/06* (2006.01)

(52) U.S. Cl. ..................... 74/720; 74/665 GC; 60/39.17

(58) Field of Classification Search ................... 74/661, 74/665 R, 718, 720, 665 A, 665 B, 665 C, 74/665 GB, 665 GC, 665 L, 665 M, 665 N; 60/39.17, 792
See application file for complete search history.

(56) References Cited

U.S. PATENT DOCUMENTS

| | | | | |
|---|---|---|---|---|
| 3,488,947 A | * | 1/1970 | Miller et al. ................... | 60/791 |
| 3,507,113 A | * | 4/1970 | Hagemeister et al. ..... | 60/39.163 |
| 3,635,019 A | * | 1/1972 | Kronogard et al. ........ | 60/39.163 |
| 3,665,788 A | * | 5/1972 | Nyman ......................... | 475/72 |
| 3,868,818 A | * | 3/1975 | Itoh ........................... | 60/39.15 |
| 4,341,132 A | * | 7/1982 | Burdick ....................... | 475/72 |
| 4,699,021 A | * | 10/1987 | Waddington .................. | 477/1 |
| 4,876,849 A | * | 10/1989 | Klingels ...................... | 60/792 |
| 5,694,765 A | | 12/1997 | Hield et al. | |
| 7,418,821 B2 | * | 9/2008 | Butt ............................. | 60/778 |
| 2006/0034693 A1 | | 2/2006 | Lardellier | |

FOREIGN PATENT DOCUMENTS

FR 2 520 806 8/1983
FR 2 863 312 6/2005

OTHER PUBLICATIONS

U.S. Appl. No. 11/608,528, filed Dec. 8, 2006, Linet, et al.

* cited by examiner

*Primary Examiner*—Roger Pang
(74) *Attorney, Agent, or Firm*—Oblon, Spivak, McClelland, Maier & Neustadt, L.L.P.

(57) ABSTRACT

A device drives auxiliary machines by using power extracted from a multi-shaft gas turbine engine. The gas turbine engine may include a LP shaft and a HP shaft. The machines may be installed in a gearbox. The device may include a first mechanical transmission between the HP shaft and the gearbox. The device also may include a hydraulic transmission between the LP shaft and the gearbox. Further, the LP shaft connects a low pressure turbine to a low pressure compressor, the HP shaft connects a high pressure turbine to a high pressure compressor, and the low pressure compressor is upstream of the high pressure compressor.

16 Claims, 2 Drawing Sheets

DEVICE FOR DRIVING ACCESSORY MACHINES OF A GAS TURBINE ENGINE

BACKGROUND OF THE INVENTION

1. Field of the Invention

The present invention relates to the field of multi-shaft gas turbine engines, for aviation application in particular, and is aimed at a means of offtaking mechanical power from the rotor shafts in order to drive accessories.

2. Description of Related Art

A gas turbine engine usually comprises an air compressor set at least partially supplying a combustion chamber. The gases from the latter drive one or more turbines mechanically connected to the compressors, and supply the thrust. A double-shaft engine comprises a "low pressure" compressor set connected via a first shaft to a group of low pressure turbines, the assembly forming the low pressure, LP, shaft. It also comprises a second shaft, called the high pressure, HP, shaft, fixedly attached to a second shaft concentric with the first. The two rotors are mechanically free to rotate relative to one another. The HP shaft is in direct communication with the combustion chamber. Turbojets, civil aviation turbojets in particular, usually comprise a fan rotor driven by the LP shaft and delivering a large part of the thrust.

A part of the power supplied by aviation turbine engines is used to supply the auxiliary machines both of the turbine engines themselves and of the aircraft of which they provide the propulsion.

In a multi-shaft engine, this power is currently taken off partly mechanically from the shaft of the high pressure stage to drive a receiving input shaft of a gearbox for driving the accessories. This gearbox is also called the AGB (for accessory gear box). For a turbofan turbojet for example, the AGB gearbox is placed on the fan casing. Its input shaft is usually driven by a transmission shaft housed in one of the structural arms of the casing and connected through an angle transmission gearbox to a pinion fixedly attached to the high pressure shaft. Various accessory machines, such as generators and hydraulic fuel or oil pumps, are installed in this gearbox and driven by means of gear sets.

Another part of the offtake consists of the pressurized air bled off from the high pressure compressor to provide in particular the pressurization and air conditioning of the aircraft cabin or else the de-icing.

The current trend is aimed at increasing the proportion of the mechanical power offtake due to the increasing proportion of the electrical means, considered more flexible to use. This increasing demand for electrical supply for the equipment of the aircraft no longer makes it possible, for reasons of engine operation and performance, mainly at low rotation speeds, to take off the power from the HP shaft only. Such an offtake would be likely to cause surging of the compressor.

SUMMARY OF THE INVENTION

A means of increasing the power offtake in the new applications of turbine engines is to apply a system of mixed mechanical power offtake from the HP and LP bodies of the engine.

However, the HP and LP bodies rotate independently at different speeds and have different operating ranges. Between the idling speed and the full gas speed, the speed ratio for the HP shaft is of the order of 2, for example the rotation speed increases from 10 000 revolutions per minute to 20 000 revolutions per minute. On the other hand, the ratio for the LP shaft is of the order of 5; its speed increases, for example, from 900 revolutions per minute at idling speed to 4500 at full gas speed. In addition, the accessories installed on the AGB gearbox have a determined operating range compatible with that of the HP shaft.

The object of the invention is to achieve a mixed power offtake from the HP and LP bodies while providing the AGB gearbox with a range of speeds compatible with the operation of the equipment installed thereon.

According to the invention, the device for driving auxiliary machines of a multi-shaft, particularly double-shaft, gas turbine engine with an LP shaft and an HP shaft, the said machines being installed on a gearbox and the device comprising a first mechanical transmission between the shaft of the HP shaft and the said gearbox, is characterized in that it also comprises a hydraulic transmission between the shaft of the LP shaft and the said gearbox.

"Gearbox" means a support of auxiliary machines provided with means of mechanically driving the latter from one or more movement offtakes.

Thanks to the device of the invention, the LP shaft is capable of participating in the driving of the gearbox equipment according to the engine speed. The result is a lightening of the power offtakes from the HP shaft during phases having engine operability problems. The hydraulic transmission also makes it possible to transmit the power from the LP shaft without imposing a rotation speed, and, because the gearbox remains driven mechanically by the HP shaft, through this first mechanical transmission, the input speed is controlled by that of the HP shaft. In this way, control of the gearbox speed is kept compatible with the operation of the existing equipment mounted on the gearbox.

According to a first embodiment, the hydraulic transmission comprises a hydrostatic variator with a hydraulic pump connected via a second mechanical transmission to the LP shaft, and connected via a hydraulic circuit to a hydraulic motor, itself connected via a third mechanical transmission to the said gearbox.

More particularly, the first transmission and the third transmission are connected in parallel to the gearbox. Depending on the pump used, the second transmission comprises a speed reduction gear.

This embodiment is advantageous because it allows a great flexibility of application; in particular, it is possible to place the pump and the motor in separate locations which may be at a distance from one another.

Advantageously, at least one of the pump and the motor has positive displacement, and preferably variable cubic capacity.

The hydraulic circuit comprises a fluid accumulator downstream of the pump, thus allowing its pressure to be controlled. A member for controlling the output of the hydraulic motor allows the top-up power provided by the LP shaft to be adjusted.

According to another embodiment, the third mechanical transmission comprises a differential gear with an epicyclic gear set.

This solution makes it possible to reduce the power transmitted via the hydraulic transmission and consequently the dimension of this part.

The epicyclic gear set consists of three stages: cage, sun gear and planet carrier. For this application, the epicyclic gear set comprises two input stages and one output stage that are to be determined according to the ratio of the chosen gear set. An input stage, the sun gear of the epicyclic gear set, is thus connected via a fourth mechanical transmission to the LP shaft, and the shaft of the hydraulic motor is mechanically connected to the other input stage, the cage of the epicyclic gear set.

More particularly, the shaft of the hydraulic motor is connected to an input via a speed reduction gear, and the output stage, the planet carrier, is connected to the gearbox.

According to a third embodiment, the hydraulic transmission comprises a hydraulic coupler connected, on the one hand, via a second mechanical transmission, to the LP shaft, on the other hand, via a third transmission, to the said gearbox. The transmitted power is controlled by a control means for filling with liquid.

As in the preceding cases, the invention makes it possible to retain control of the speed of the gearbox via the HP shaft, compatible with the operation of the engine and aircraft equipment. It also makes it possible to transmit the power originating from the LP shaft to the accessories and to lighten the power offtake from the HP shaft during phases having engine operability problems.

It also makes it possible to limit the losses due to hydrokinetic transmission for the speeds allowing 100% offtake of power from the HP shaft.

This embodiment more particularly has the advantage of great simplicity of application even though the coupler is per se a bulkier item of equipment than the preceding hydraulic solution.

BRIEF DESCRIPTION OF THE DRAWING(S)

Other features and advantages will emerge from the description of the three embodiments of the invention accompanied by the appended drawings in which.

DETAILED DESCRIPTION OF THE PREFERRED EMBODIMENTS

Figure 1:
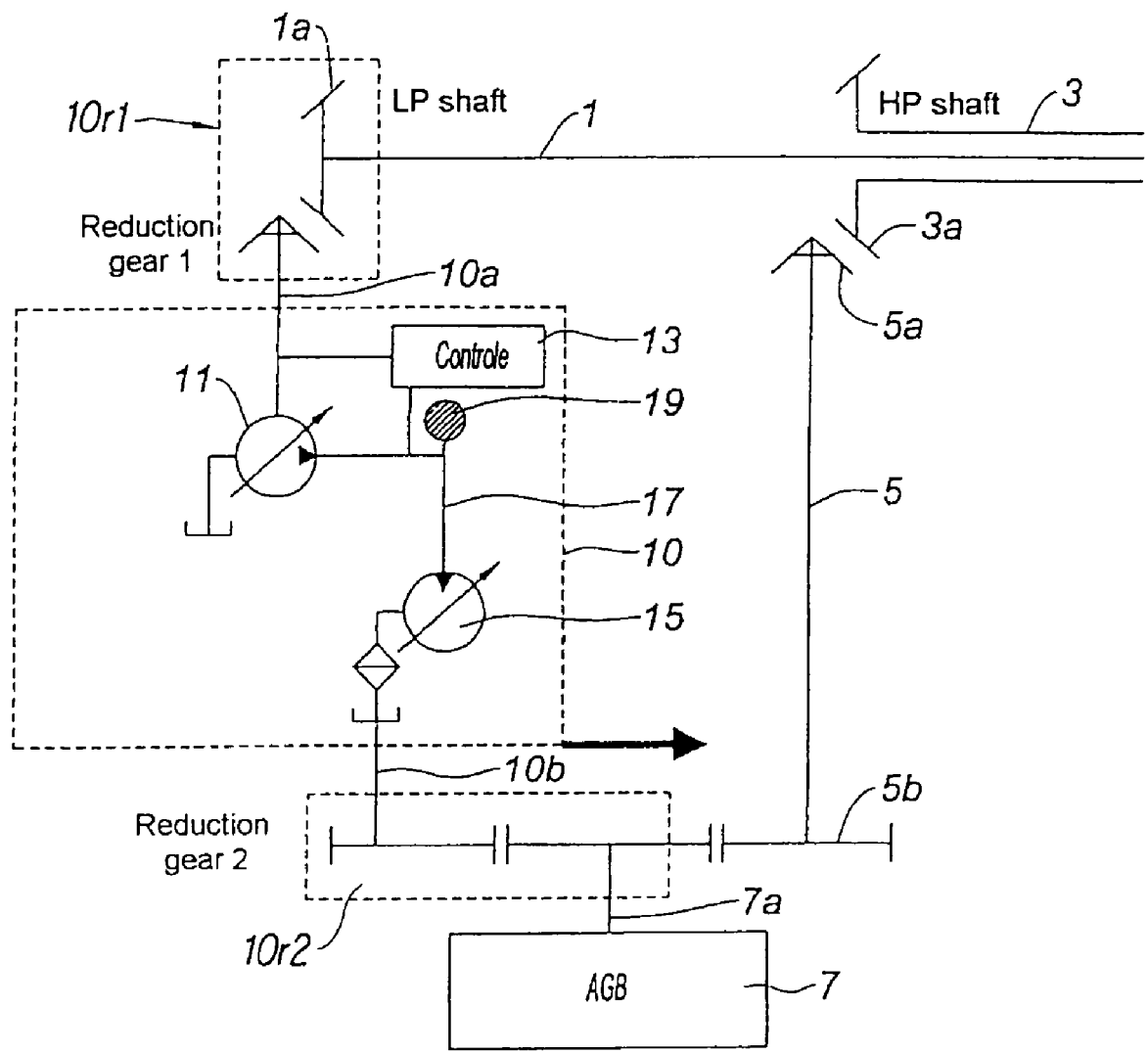
FIG. 1 is a schematic representation of an example relating to the first embodiment.

The embodiment with reference to FIG. 1 relates to a double-shaft gas turbine engine; of the turbine engine all that has been represented is the two shafts 1 and 3; one corresponds to the LP shaft and the other to the HP shaft. As is known from the current embodiments, the two shafts are concentric and mechanically free to rotate relative to one another. Depending on the type of engine, they are co-rotational or contra-rotational in operation. The LP shaft is mounted via appropriate bearings inside the HP shaft. In the case of a dual flow turbojet, it drives a fan, for example placed at the front.

Each of the two shafts is provided with a pinion, 1a and 3a, respectively, for driving transmission shafts. A first shaft 5, forming a first mechanical transmission, with, at one end, a movement offtake member 5a, a pinion for example, on the HP shaft is placed radially relative to the axis of the engine, defined by the two shafts 1 and 3. At its other end, it transmits, via a gear 5b, the rotary movement to an input shaft 7a of the accessory gearbox 7. This gearbox will also not be described in further detail because it is not part of the invention. It comprises a frame, provided with gears connected to one or more movement offtake shafts. The composition of the elements that are mounted in the gearbox depends on the engine that it serves. Particularly in the case where the engine is a civil aviation turbofan turbojet, the gearbox is coupled to the fan casing and the transmission shaft 5 is placed radially in a structural arm of the casing.

According to the invention, in this first embodiment, the input shaft 7a is driven by a hydraulic transmission means 10, which is a hydrostatic variator, from the LP shaft. The means 10 is mechanically connected via a second mechanical transmission 10r1 to the shaft 1. It may be a pinion meshing on a pinion fixedly attached to the shaft 1. It may also be a speed reduction gear device if that is necessary. The means 10 is mechanically connected via a shaft 10b to the input shaft 7a of the gearbox here by means of a speed reduction gear device, forming a third mechanical transmission 10r2. The hydrostatic transmission comprises a pump 11 driven mechanically by the shaft 10a. The reduction gear 10r1 makes it possible to match the speed of the input shaft to that of the pump. Advantageously it is a positive displacement pump with variable cubic capacity. An example of this type of pump comprises an adjustable inclination plate. The variation of the angle of inclination of the plate changes the stroke of the pistons of the pump and its cubic capacity. The cubic capacity is controlled by a control member 13. The pump supplies a variable cubic capacity hydraulic motor 15 with hydraulic fluid also via a duct 17. A fluid accumulator 19 is placed in parallel on this duct 17 downstream of the pump. Note that, in this system, the hydraulic circuit is independent of the other hydraulic circuits.

The management of the power offtake from the LP shaft is obtained by controlling the pump 11 and the motor 15 via the control device 13 as a function in particular of the speeds of the shafts 10a and 10b and the pressure delivered by the pump.

The speed of the hydraulic motor is imposed by the speed of rotation of the shaft 7a connected kinematically to the HP shaft. The result is that, irrespective of the engine speed, the gearbox drives the equipment it supports at a speed that has the same operating range as the HP shaft.

The device operates in the following manner during the multi-offtake phase.

According to a first option, the service pressure of the pump 11 is kept at a constant value: $\Delta P = 350$ b for example. Control of the motor 15 is obtained by varying its cubic capacity. Specifically, the power transmitted by the latter is given by the relation:

$$\text{Motor power} = \text{motor speed} \times \text{cubic capacity} \times \Delta P.$$

Since the motor speed is imposed by that of the HP shaft, and the service pressure is kept constant by the pump, the motor power is proportional to the volume of fluid passing through it, hence to the cubic capacity.

According to a second option, the motor cubic capacity is kept at its maximal value, the power transmitted is then proportional to $\Delta P$. The pressure of the hydraulic circuit is controlled by varying the cubic capacity of the pump.

An advantage of the solution shown here is that this system introduces no kinematic link between the two bodies, LP and HP.

Furthermore, beyond a certain speed, the HP shaft is in a field of operation allowing it to provide all the power to the gearbox. The mixed power offtake system may then be deactivated. To do this, the control system 13 commands the pump and the motor to zero pressure and output. The pump and the motor are then placed under negative pressure in order to reduce losses and drag.

Similarly, on start-up, if the latter is carried out by means of the gearbox, the power is transmitted from the starter motor directly to the HP shaft and the hydrostatic transmission is set to the idle state. The plates of the pump and of the motor are driven to given minimal cubic capacity. Specifically, start-up is achieved by driving the HP shaft only.

Figure 2:
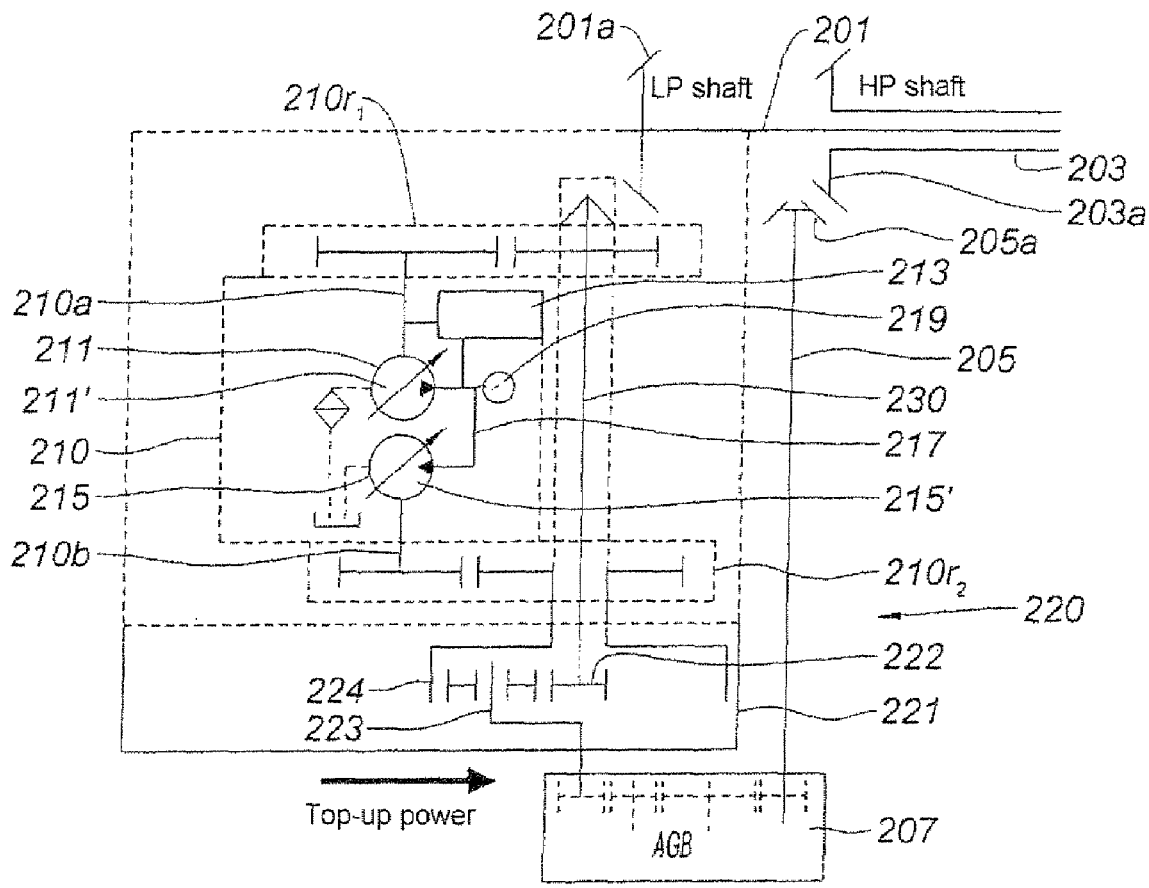
FIG. 2 is a schematic representation of an example relating to the second embodiment.

With reference to FIG. 2, relating to a second embodiment, the elements corresponding to those of FIG. 1 have been shown by adding 200 to the reference numbers. It shows the LP shaft 201 and the HP shaft 203 of the double-shaft turbine engine, not shown. The shaft 203 is connected to the auxiliary machine gearbox 207, the AGB, via a first mechanical transmission 205, here a transmission shaft meshing via a pinion 205a with a pinion 203a of the HP shaft, the two forming an angle transmission.

According to the invention, a hydraulic transmission is arranged between the LP shaft 201 and the gearbox 207. This transmission forms part of a hydromechanical transmission described hereinafter.

The hydrostatic part of the transmission comprises, as in the preceding solution, a hydrostatic variator 210. The latter comprises a hydraulic pump 211 and a hydraulic motor 215 connected via a hydraulic circuit 217. The two machines 211 and 217 have variable cubic capacity; this is shown by the arrows 211' and 215' respectively. An accumulator is placed in parallel on the circuit 217 and allows the control of the pump pressure. A control member 213 receives the speed parameters of each of the shafts 210a and 210b of the two machines, the pressure of the circuit and the set point values, and sends a signal for controlling the cubic capacity of the motor 216 and/or of the pump as in the first embodiment.

The shaft 210a for driving the pump 211 is connected via a second mechanical transmission 210r1 to the LP shaft. It is in particular a speed reduction gear for matching the two speeds to one another.

The shaft 210b driven by the motor 215 is connected to the gearbox 207 via a third mechanical transmission 220.

The latter comprises an epicyclic gear set differential 221. The latter consists of a sun gear 222, planet gears with their planet carrier 223, and a cage 224. The sun gear 222 is connected via a fourth mechanical transmission 230 to the LP shaft, here represented by a transmission shaft meshing with the shaft 201. Between the shaft 210b of the hydraulic motor 215 and the cage 224 of the differential 221, the third transmission 220 also comprises a speed reduction gear 210r2. The planet carrier 223 is connected to an input shaft of the gearbox 207.

Via this assembly, the LP shaft transmits power directly to the input formed by the sun gear 222 of the epicyclic gear set 221 and indirectly to the input, formed by the cage 224, via the hydrostatic variator. The output of the epicyclic gear set 221, formed by the planet carrier 223, is connected to the AGB.

The speeds of the input and of the output of the epicyclic gear set 221 are imposed respectively by the LP shaft, via the fourth mechanical transmission 230 and via the gearbox 207 connected to the HP shaft via the first transmission 205. The speed of the hydraulic motor 215 is then fixed by the ratio of the epicyclic gear set.

The ratio of the epicyclic gear set is chosen in order to minimize the power passing through the hydrostatic transmission and reduce the losses at the maximum speed of use.

The device operates in the same manner as the first embodiment.

During the multi-offtake phase.

According to a first option, the service pressure of the pump 211 is kept at a constant value: $\Delta P=350$ b for example. The motor 215 is controlled by varying its cubic capacity.

Since the motor speed is imposed by that of the HP shaft, and the service pressure is kept constant by the pump, the motor power is proportional to the volume of fluid passing through it, hence to the cubic capacity.

According to a second option, the motor cubic capacity is kept at its maximal value, the transmitted power is then proportional to $\Delta P$. The pressure of the hydraulic circuit is controlled by varying the cubic capacity of the pump.

Beyond a certain speed, the HP shaft is in a field of operation allowing it to provide all the power to the gearbox. The mixed power offtake system may then be deactivated. To do this, the control system 213 commands the pump and the motor to zero pressure and output. The pump and the motor are then placed under negative pressure in order to reduce losses and drag.

Similarly, on start-up, if the latter is carried out by means of the gearbox, the power is transmitted from the starter motor directly to the HP shaft and the hydrostatic transmission is set to the idle state. The plates of the pump and of the motor are driven to given minimal cubic capacity. Specifically, start-up is achieved by driving the HP shaft only.

Figure 3:
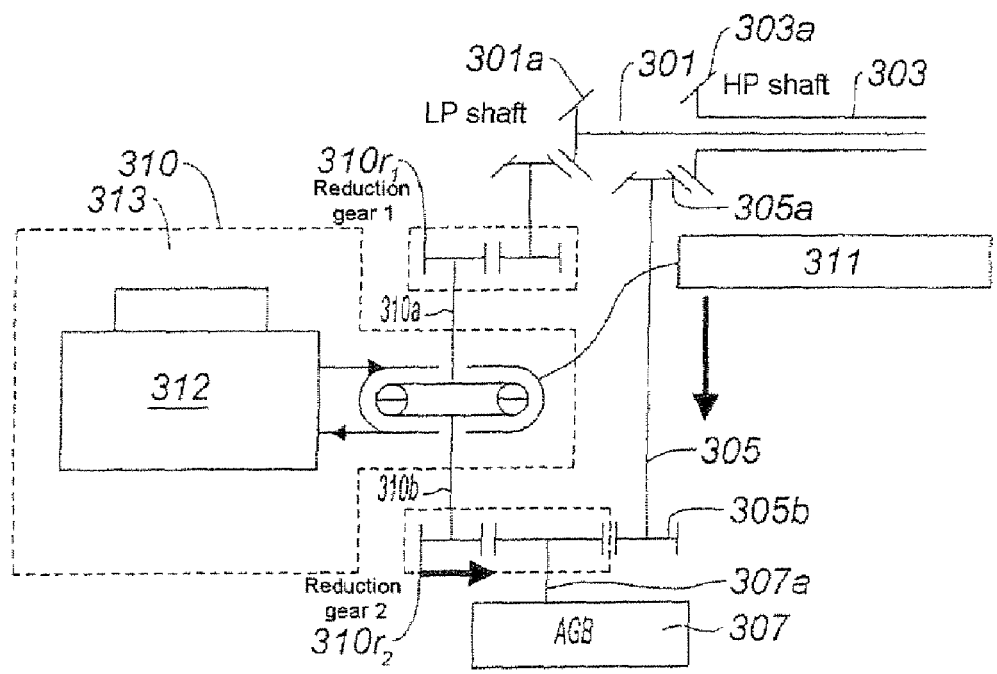
FIG. 3 is a schematic representation of an example relating to the third embodiment.

With reference to FIG. 3, relating to a third embodiment, it shows the elements corresponding to those of FIG. 1, by adding 300 to the reference numbers.

It shows a first and a second shaft, 301 and 303 respectively. These are the LP and HP shafts respectively of a double-shaft gas turbine engine not shown. These two shafts are provided with appropriate pinions 301a and 303a for the movement offtake. The first allows the movement offtake via the input shaft 310a of a transmission device 310, here hydrokinetic. The second 303a allows the movement offtake via the pinion 305a of a transmission shaft 305 forming the first transmission means. Between the pinion 301a and the input shaft 310a, a second mechanical transmission 310r1 is provided in the form of a speed reduction gear.

As in the preceding cases, an accessory gearbox 307, offset relative to the motor, is driven by these two means. The first means 310 comprises a shaft 310b driving the shaft 307a via a speed reduction gear device 310r2 forming a third mechanical transmission. The shaft 307a is also rotated by the shaft 305 via an appropriate gear 305b.

The hydrokinetic transmission is known per se; it comprises a hydraulic coupler, also called a hydraulic torque converter 311 connected to a partial filling control system 312. The system 312 comprises a filling and emptying pump controlled by a control member 313. The hydraulic coupler, as is known, consists of a first rotor provided with vanes forming a pump, facing a second rotor forming a turbine. When the rotor is rotated, the vanes expel the hydraulic fluid into the vanes of the second rotor forming a turbine and set it in motion. By varying the quantity of fluid present between the two rotors, the power transmitted from one rotor to the other is also varied because the speed of the second rotor is imposed by that of the reduction gear 310r2. This system, like the first, has the advantage of introducing no kinematic link between the LP and HP bodies.

The reduction ratios of the two reduction gears are chosen so as to create a positive speed transition between the pump and the turbine of the hydrokinetic transmission in the operating range of the two bodies of the turbine engine. The rotation speed of the turbine of the system is imposed by the rotation speed of the gearbox itself connected kinetically with the HP shaft. The gearbox then drives the equipment at a speed having the same operating range as that of the HP shaft.

The power transmitted by the transmission 310 is proportional to the rotation speed of the pump and the fluid output. This fluid output is regulated by the system performing a partial filling of the transmission 310 and controlled according to the LP and HP speeds. This control system makes it possible to obtain the desired power offtake from the LP shaft.

Beyond a certain speed, the HP shaft is in an operating field that allows it to provide all the power to the gearbox. The power offtake system may then be deactivated. To do this, the transmission 310 is emptied and placed under negative pressure in order to reduce losses and drag.

The invention claimed is:

1. A device for driving auxiliary machines of a double-shaft gas turbine engine, the engine including an LP shaft and an HP shaft, said machines being installed in a gearbox, and the device comprising:
   a first mechanical transmission between the HP shaft and said gearbox; and
   a hydraulic transmission between the LP shaft and said gearbox, wherein the LP shaft connects a low pressure turbine to a low pressure compressor, the HP shaft connects a high pressure turbine to a high pressure compressor, and the low pressure compressor is upstream of the high pressure compressor.

2. The device according to claim 1, wherein the hydraulic transmission comprises a hydrostatic variator with a hydraulic pump connected via a second mechanical transmission to the LP shaft and the hydraulic pump connected via a hydraulic circuit to a hydraulic motor, and the hydraulic motor is connected via a third mechanical transmission to said gearbox.

3. The device according to claim 2, wherein the third transmission and the first transmission are connected in parallel to the gearbox.

4. The device according to claim 2, wherein the second transmission comprises a speed reduction gear.

5. The device according to claim 2, wherein at least one of the hydraulic pump and the hydraulic motor has a positive displacement.

6. The device according to claim 3, wherein the hydraulic pump and/or the hydraulic motor have a variable cubic capacity.

7. The device according to claim 2, wherein the hydraulic circuit comprises a fluid accumulator downstream of the hydraulic pump.

8. The device according to claim 2, comprising a member for controlling an output of the hydraulic motor.

9. Device according to claim 2, in which the third mechanical transmission comprises a differential gear with an epicyclic gear set consisting of three stages: cage, sun gear and planet carrier.

10. Device according to claim 9, in which one of said cage and sun gear being of an input stage of the epicyclic gear set is connected via a fourth mechanical transmission to the LP shaft.

11. Device according to claim 10, in which the shaft of the hydraulic motor is connected to the other one of said cage and sun gear of the epicyclic gear set.

12. Device according to claim 10 in which the shaft of the hydraulic motor is connected to the input stage of the epicyclic gear set via a speed reduction gear.

13. Device according to claim 9, the planet carrier being of an output stage is connected to the gearbox.

14. Device according to claim 1, in which the hydraulic transmission comprises a hydraulic coupler connected, on the one hand, via a second mechanical transmission, to the LP shaft, on the other hand, via a third transmission, to the said gearbox.

15. Device according to claim 14, in which the coupler comprises a control means for filling with liquid.

16. The device according to claim 2, wherein the LP shaft and the HP shaft are both configured to be mechanically free to rotate relative to one another.

\* \* \* \* \*